(12) United States Patent
Tuttle et al.

(10) Patent No.: US 10,139,047 B2
(45) Date of Patent: Nov. 27, 2018

(54) STRESS RELIEVED WELDS IN POSITIVE EXPULSION FUEL TANKS WITH ELASTOMERIC DIAPHRAGM

(71) Applicant: Keystone Engineering Company, Long Beach, CA (US)

(72) Inventors: Wayne H. Tuttle, Torrance, CA (US); Ian Ballinger, Anaheim Hills, CA (US)

(73) Assignee: Keystone Engineering Company, Long Beach, CA (US)

( * ) Notice: Subject to any disclaimer, the term of this patent is extended or adjusted under 35 U.S.C. 154(b) by 573 days.

(21) Appl. No.: 14/797,352

(22) Filed: Jul. 13, 2015

(65) Prior Publication Data

US 2017/0016574 A1    Jan. 19, 2017

(51) Int. Cl.
*B23K 26/00*      (2014.01)
*F17C 1/02*       (2006.01)
(Continued)

(52) U.S. Cl.
CPC .............. *F17C 1/02* (2013.01); *B64G 1/402* (2013.01); *C21D 1/30* (2013.01); *C21D 1/42* (2013.01);
(Continued)

(58) Field of Classification Search
CPC ........ B23K 9/0026; B23K 9/028; B23K 9/23; B23K 10/02; B23K 15/0006;
(Continued)

(56) References Cited

U.S. PATENT DOCUMENTS 3,917,117 A * 11/1975 Plotsky ............... B65D 88/62
222/386.5
4,898,030 A *  2/1990 Yeh ....................... B64G 1/402
244/135 R
(Continued)

OTHER PUBLICATIONS

W. A. Baeslack, III, Technical Note: Evaluation of Triplex Postweld Heat Treatments for Alpha-Beta Titanium Alloys, Jun. 1982, pp. 197-s-200-s.
(Continued)

*Primary Examiner* — Mark Paschall
(74) *Attorney, Agent, or Firm* — Kinney & Lange, P.A.

(57) ABSTRACT

A metallic positive expulsion fuel tank with stress free weld seams may include a first hemispherical shell with a first edge; a pressurized gas inlet attached to the first hemispherical shell; and a metallic cylinder with first and second edges attached to the first hemispherical shell along matching first edges by a first weld seam. The tank may also include a second hemispherical shell with a first edge attached to a fuel outlet fixture. An elastomeric diaphragm may be attached to the fuel outlet fixture on the second hemispherical shell. The second hemispherical shell may be attached to the second edge of the metallic cylinder along matching edges by a second weld seam thereby forming a positive expulsion fuel tank with two interior chambers separated by the elastomeric diaphragm. The first and second weld seams may be subjected to a localized post-weld stress relief heat treatment in which heating of the tank is confined to a distance of 2 inches (5.08 cm) of the first weld seam and a distance of 2 inches (5.08 cm) of the second weld seam such that the stresses in the first and second weld seams are relieved and the elastomeric diaphragm is unaffected by the heat treatment.

20 Claims, 5 Drawing Sheets

(51) Int. Cl.
*F17C 13/00* (2006.01)
*C22C 14/00* (2006.01)
*C22F 1/18* (2006.01)
*C21D 1/30* (2006.01)
*C21D 1/42* (2006.01)
*C21D 1/74* (2006.01)
*B64G 1/40* (2006.01)

(52) U.S. Cl.
CPC .............. *C21D 1/74* (2013.01); *C22C 14/00* (2013.01); *C22F 1/183* (2013.01); *F17C 13/002* (2013.01); *F17C 13/008* (2013.01); F17C 2201/0128 (2013.01); F17C 2201/0185 (2013.01); F17C 2203/0636 (2013.01); F17C 2203/0646 (2013.01); F17C 2203/0648 (2013.01); F17C 2209/221 (2013.01); F17C 2209/232 (2013.01); F17C 2221/08 (2013.01); F17C 2223/0161 (2013.01); F17C 2227/0192 (2013.01); F17C 2260/011 (2013.01); F17C 2265/066 (2013.01); F17C 2270/0194 (2013.01); Y02P 10/253 (2015.11)

(58) Field of Classification Search
CPC ............ B23K 15/0053; B23K 15/0093; B23K 2203/0636; B23K 26/28; B23K 26/32; F17C 1/02; F17C 2203/0636; F17C 2209/021; F17C 2260/0111; F17C 2201/0128; B64G 1/402
USPC ............ 219/121.64, 121.63, 121.45, 121.46, 219/137 R
See application file for complete search history.

(56) References Cited

U.S. PATENT DOCUMENTS

| | | | | |
|---|---|---|---|---|
| 4,901,762 | A * | 2/1990 | Miller, Jr. | B64G 1/402 |
| | | | | 137/574 |
| 5,441,113 | A * | 8/1995 | Pierce | A62C 37/21 |
| | | | | 169/15 |
| 5,697,511 | A * | 12/1997 | Bampton | B23K 20/1265 |
| | | | | 220/4.12 |
| 8,079,126 | B2 * | 12/2011 | Bampton | B23K 20/1225 |
| | | | | 220/562 |
| 2003/0183638 | A1 * | 10/2003 | Minta | F17C 1/002 |
| | | | | 220/560.13 |
| 2005/0137071 | A1 * | 6/2005 | Cormier | G03G 15/751 |
| | | | | 492/56 |
| 2006/0129240 | A1 * | 6/2006 | Lessar | A61F 2/4425 |
| | | | | 623/17.14 |

OTHER PUBLICATIONS

W. A. Baeslack, III et al., A Comparative Evaluation of Laser and Gas Tungsten Arc Weldments in High-Temperature Titanium Alloys, Jul. 1981, pp. 121-s-130-s.
J. Sieniawski et al., Microstructure and Mechanical Properties of High Strength Two-Phase Titanium Alloys, May 15, 2013.
Daniel H. Hering, Heat Treatment of Titanium Alloys, Feb. 7, 2013.
Daniel H. Hering, Practical Aspects Related to the Heat Treatment of titanium and Titanium Alloys, Feb. 1, 2007.
Tatsuro Morita et al., Strengthening of Ti-6AI-4V Alloy by Short-Time Duplex Heat Treatment, Jul. 15, 2005, pp. 1681 to 1686, vol. 46, No. 7.
http://www.keytometals.com/Article97.htm, Heat Treating of Titanium and Titanium Alloys, Apr. 2004.

* cited by examiner

STRESS RELIEVED WELDS IN POSITIVE EXPULSION FUEL TANKS WITH ELASTOMERIC DIAPHRAGM

BACKGROUND

This invention relates to the post-weld heat treatment of thin wall metal structures. In particular the invention relates to a method of locally heat treating a weld seam without thermally affecting material adjacent to the weld.

The shells of typical positive expulsion propellant fuel tanks for spacecraft that incorporate elastomeric diaphragms are fabricated by welding metal domes or domes and cylinders together. Additionally, the diaphragm and its supporting structure are typically welded into the tank shell components prior to final shell assembly. Of the many important design criteria associated with a spacecraft, an overriding design driver is the need for low mass. The need for reduced mass drives the material choices and the wall thickness of the tank design. In the area of the welds that hold the domes and/or cylinders together, the wall thickness is often greater than the rest of the tank wall because of the reduced strength and toughness available in the welds and the adjacent heat affected zone. Much of the available tensile strength can be restored through the use of post-weld heat treatment (PWHT) for recovery of ductility and/or stress relief.

While the PWHT of the tank shell can be readily accomplished using industry practices such as vacuum heat treatment and retort heat treatment with the part sealed in a container of inert gas, many tanks utilize elastomeric diaphragms to separate the propellants from pressurants to enable positive expulsion of propellants in microgravity. The elastomeric materials may be damaged by exposure to the high temperatures required for thermal stress relief during PWHT, which prevents the use of conventional furnaces to raise the temperature of the entire tank to the stress relief temperatures. Without stress relief the reduced material properties and residual tensile stresses remain in the weld areas of the tank shell. As a result, the tank must be made thicker to provide sufficient safety margin. The increased thickness and resultant increased mass is detrimental to the utility of the tank.

SUMMARY

A metallic positive expulsion fuel tank with stress relieved weld seams may include a first hemispherical shell with a first edge. The tank may also include a pressurized propellant gas inlet fixture attached to the first hemispherical shell. The tank may also include a metallic cylinder with first and second edges attached to the first hemispherical shell along matching first edges by a first weld seam. The tank may also include a second hemispherical shell with a first edge and an attached fuel outlet fixture. An elastomeric diaphragm may be attached to the fuel outlet fixture on the second hemispherical shell. The second hemispherical shell may be attached to the cylinder along matching first and second edges by a second weld seam thereby forming a positive expulsion fuel tank with two interior chambers separated by the elastomeric diaphragm. The first and second weld seams may be subjected to a localized post-weld stress relief heat treatment in which heating of the tank is confined to a distance of 2 inches (5.08 cm) from the first weld seam and a distance of 2 inches (5.08 cm) from the second weld seam such that stresses in the first and second weld seams are relieved and the elastomeric diaphragm is unaffected by the heat treatment.

A method of forming a metallic positive expulsion fuel tank may include forming a first hemispherical shell with a first edge and attaching a pressurized gas inlet fixture to the first hemispherical shell. The method may also include forming a metallic cylinder with first and second edges and attaching the cylinder to the first hemispherical shell along matching first edges by a first weld seam. The method may further include forming a second hemispherical shell with a first edge and attaching a fuel outlet fixture to the second hemispherical shell. The method may also include forming an elastomeric diaphragm and attaching the elastomeric diaphragm to the fuel outlet fixture on the second hemispherical shell. Additional steps may include welding the second hemispherical shell to the metallic cylinder along matching first and second edges to form a second weld seam and a positive expulsion fuel tank with two interior chambers separated by the elastomeric diaphragm. In a final step, a localized post-weld stress relief heat treatment may be performed on the first and second weld seams during which heating of the tank is confined to a distance of 2 inches (5.08 cm) from the first weld seam and a distance of 2 inches (5.08 cm) from the second weld seam such that stresses in the first and second weld seams are relieved and the elastomeric diaphragm is unaffected by the heat treatment.

DETAILED DESCRIPTION

An accepted method of providing fuel to spacecraft engines in gravity free environments is by positive expulsion propellant fuel tanks. These tanks are structures that include hemispherical shells or hemispherical shells and cylinders welded together to form a tank shell. A flexible diaphragm may be positioned inside the tank to form two chambers separated by the diaphragm. One chamber may contain fuel and the other chamber may contain compressed gas. Increased pressure in the gas filled chamber forces fuel out of the fuel chamber through a fuel supply fitting to an engine during operation of the system.

In prior art practice, weld seams in completed spacecraft fuel tanks can only be heat treated by subjecting the entire tank to a heat treat schedule wherein the high temperatures may degrade the mechanical properties of sensitive propulsion management devices and other structures already in place in the welded tank structure. The ability to perform post-weld heat treatments in a welded structure wherein the heat treat temperatures are confined to the immediate vicinity of the welds may alleviate many of the problems associated with overheating.

Figure 1:
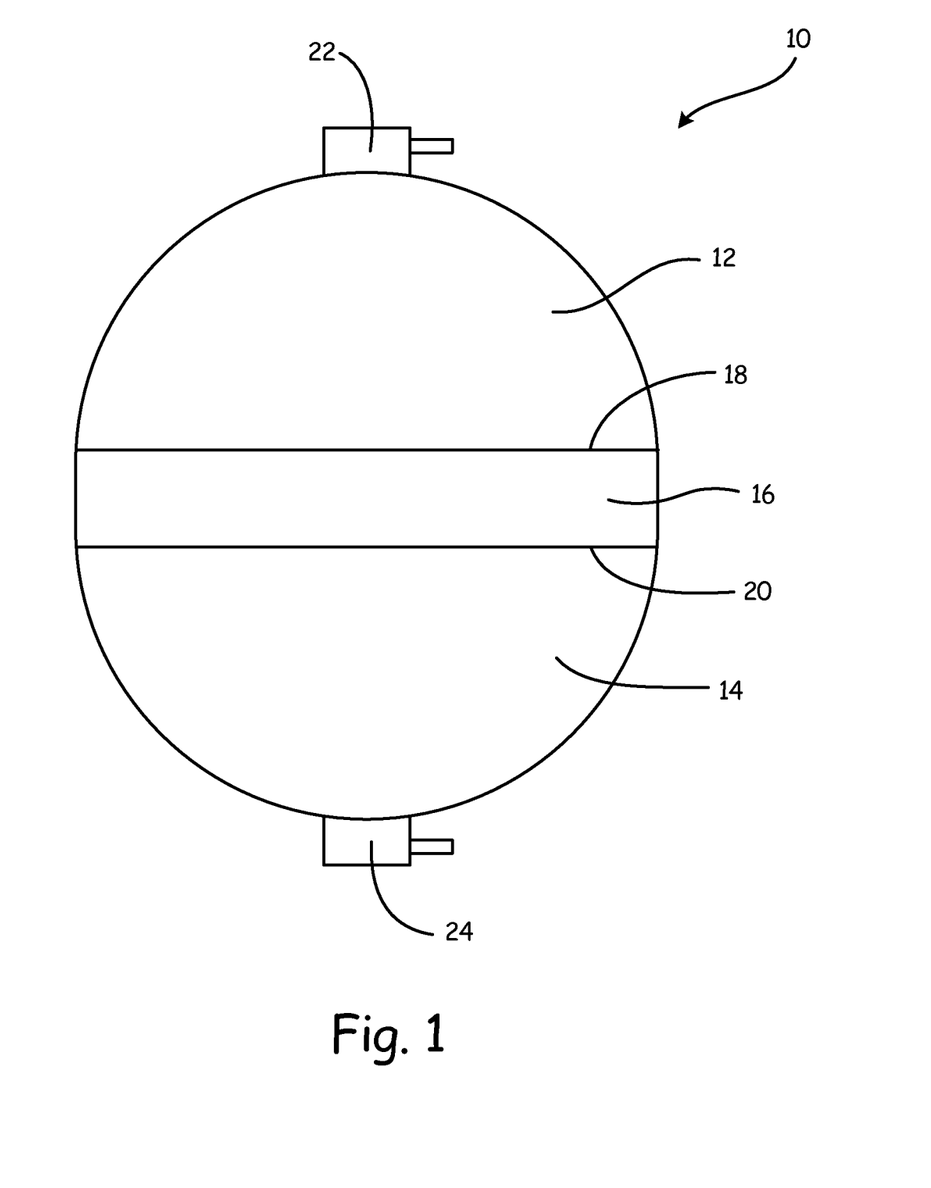
FIG. 1 is a schematic view of the exterior of a positive expulsion fuel tank.

FIG. 1 is a schematic illustration showing the external surface of positive expulsion fuel tank 10. In the embodiment shown in FIG. 1, positive expulsion fuel tank 10 may comprise hemispherical metal shells 12 and 14 joined to cylinder 16 along weld seams 18 and 20. Positive expulsion fuel tank 10 may also have pressurized gas inlet 22 and fuel outlet 24. Positive expulsion fuel tank 10 may also contain an elastomeric diaphragm (not shown) separating a pressurized gas chamber (not shown) connected to pressurized gas inlet 22 and a fuel chamber (not shown) containing propellant connected to fuel outlet 24.

Metal shells 12, 14, and 16 of fuel tank 10 may be a titanium alloy, an aluminum alloy, a corrosion resistant steel, a nickel alloy, or others known in the art. A preferred tank material for some embodiments is a titanium alloy. The thickness of tank shell 12 depends on the material and may be from about 20 mils (508 microns) to about 125 mils (3175 microns) in typical embodiments.

Figure 2:
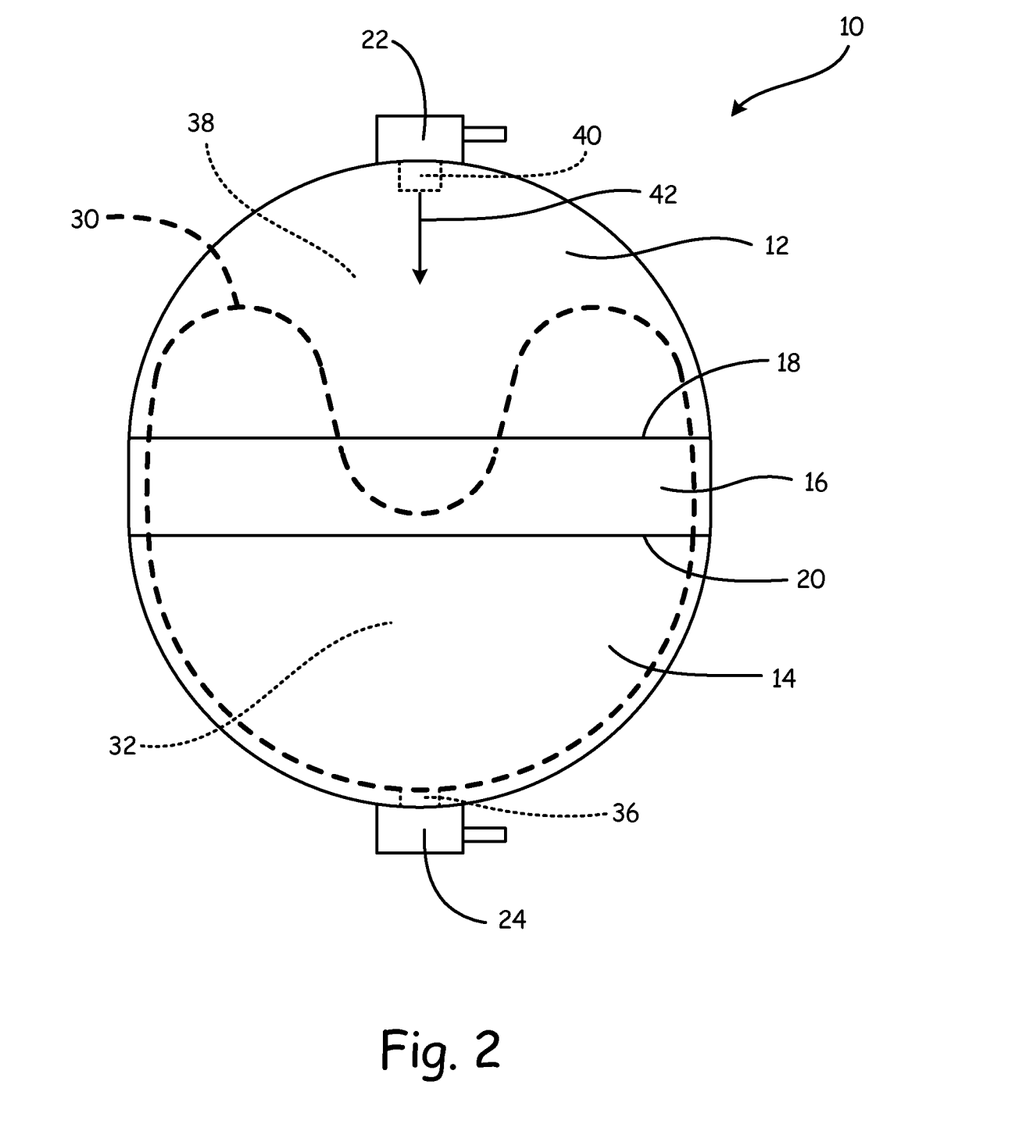
FIG. 2 is a schematic illustration of the positive expulsion fuel tank of FIG. 1 illustrating one form of an elastomeric diaphragm.

FIG. 2 is a schematic illustration of an embodiment of fuel tank 10 containing internal elastomeric diaphragm 30 shown in dashed lines in FIG. 2. Interior chamber 32 of hemispherical elastomeric diaphragm 30 may be connected to fuel outlet 24 through connection 36. Diaphragm 30 separates positive expulsion fuel tank 10 into two chambers. Chamber 32 may contain propellant and chamber 38 may contain pressurized gas that enters chamber 38 through connection 40 connected to pressurized gas inlet 22 as indicated by arrow 42.

Figure 3:
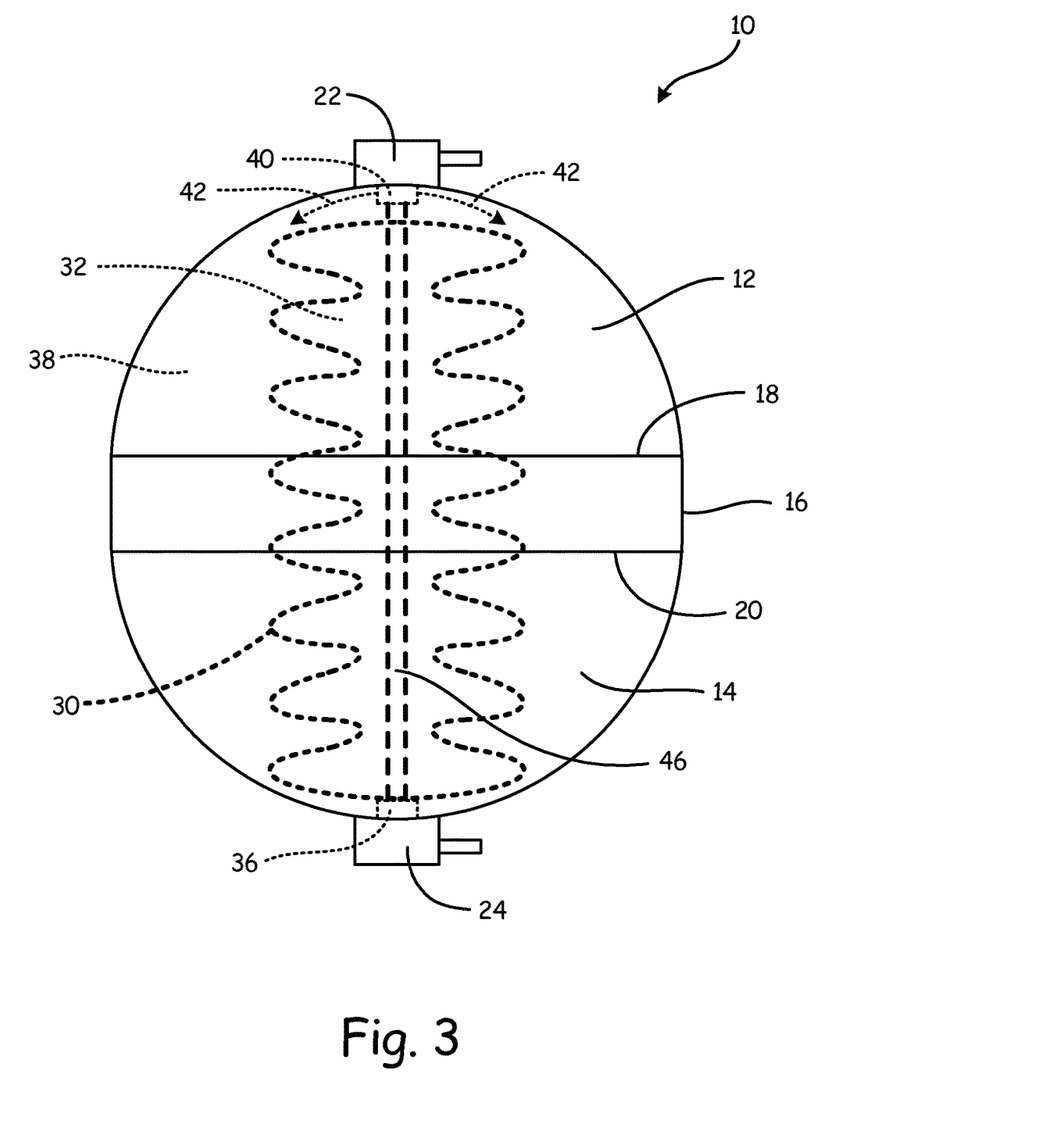
FIG. 3 is a schematic illustration of the positive expulsion fuel tank of FIG. 1 illustrating another form of an elastomeric diaphragm.

In another embodiment, the configuration of elastomeric diaphragm 30 and positive expulsion fuel tank 10 may take the form shown in FIG. 3. In this embodiment, diaphragm 30 may be supported by central perforated pipe 46 and may be attached at both ends of pipe 46. When compressed gas chamber 38 is pressurized by gas entering chamber 38 from connection 40 connected to the pressurized gas inlet 22 as shown by arrows 42, diaphragm 30 may be compressed towards central perforated pipe 46. Fuel in fuel chamber 32 may then pass into pipe 46 and exit pipe 46 through connection 36 into fuel outlet 42.

Elastomeric diaphragm 30 may be formed from a number of elastomeric materials including, but not limited to silicon, ethylene propylene diene rubber, fluoroelastomers and perfluororelastomers.

In the welded condition, welds 18 and 20 may contain at least internal tensile stresses that may need to be relieved by a post-weld heat treatment (PWHT). In addition, for many alloys, a PWHT may be required to restore lost tempers by, for instance, a solution heat treatment followed by quench and aging heat treatments. This may be accomplished by a PWHT method and PWHT apparatus described in co-pending patent application Ser. No. 14/287,975 which is hereby incorporated by reference in its entirety.

Figure 4:
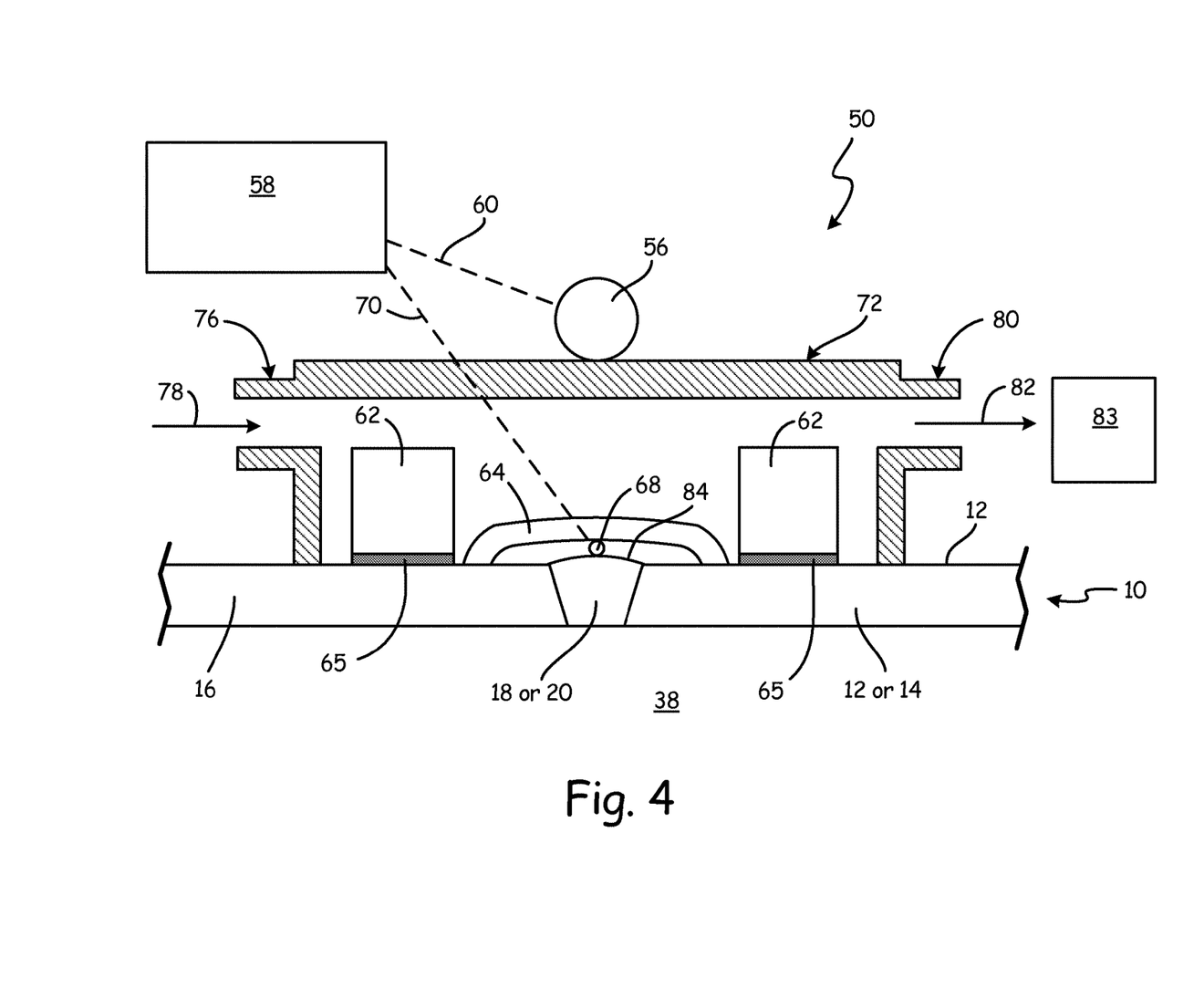
FIG. 4 is a schematic representation of a post-weld heat treatment apparatus.

The PWHT apparatus may include an enclosure covering a weld seam that may contain an inert flowing gas, water cooled cooling bands mounted on each side of the weld seam, a thermal insulating blanket covering the weld seam, and an induction coil or coils in close proximity to the weld seam to locally heat the weld seam. A schematic cross section of PWHT apparatus 50 is shown in FIG. 4. PWHT apparatus 50 is shown positioned on external surfaces of cylinder 16 and shells 12 or 14 of welded thin wall positive expulsion fuel tank 10 surrounding weld seams 18 and 20.

Apparatus 50 may further comprise induction coil 56 proximate weld seams 18 or 20. Induction coil 56 may comprise multiple induction coils as needed. Induction coil 56 may be energized by induction power supply and control system 58, as shown schematically by dashed line 60. Apparatus 50 may further comprise cooling bands 62, thermal insulating blanket 64, and thermocouple 68. Cooling bands 62 may be fluid cooled, thermoelectrically cooled, or cooled by other means known in the art. An exemplary cooling medium is water. Cooling bands 62 may be attached to positive expulsion fuel tank 10 with thermally conductive adhesive 65 to ensure maximum thermal conductivity between cooling bands 62 and positive expulsion fuel tank 10 to prevent regions of positive expulsion fuel tank 10 external to cooling bands 62 from overheating. Preferably, cooling bands 62 are placed at least about 2 inches (5.08 cm) from weld seams 18 and 20.

Thermocouple 68 supplies temperature data to induction power supply and control system 58 as schematically indicated by dashed line 70. In some embodiments, thermocouple 68 may be replaced with an infrared pyrometer, thermistor or other temperature sensing devices known in the art. Weld seams 18 and 20, cooling bands 62, thermal insulating blanket 64, and thermocouple 68 may be covered with inert atmosphere enclosure 72. Inert atmosphere enclosure 72 may include inlet port 76 attached to a source of inert gas schematically indicated by arrow 78 and exhaust port 80 containing exhaust gas schematically indicated by arrow 82. Inert atmosphere enclosure 72 may be an electrically non-conducting material enclosure that is transparent to an inductive field. Suitable non-conducting materials for inert atmosphere enclosure 72 may include flexible heat resistant materials such as silicone or rigid composites.

Inert gas (at arrow 78) may be argon, nitrogen, helium, or others known in the art. Exhaust gas (at arrow 82) may be passed through oxygen analyzer 83 to determine oxygen levels of the inert atmosphere leaving inert atmosphere enclosure 38. Oxygen levels of less than 50 ppm are preferred to prevent oxidation during the post-weld heat treatment process.

External surface 84 of weld seams 18 and 20 and adjacent regions may be under an inert atmosphere during a post-weld heat treatment. Interior 38 of positive expulsion fuel tank 10 may be filled with inert gas to prevent oxidation during the PWHT process.

In positive expulsion fuel tanks with elastomeric diaphragms, prior to a post-weld heat treatment of the present invention, the diaphragms are positioned such that the diaphragm material is safely removed from any proximity of the weld seams being treated. In the embodiment shown in FIG. 2 for instance, where diaphragm 30 is shown partially emptied, diaphragm 30 would be totally collapsed inside tank 10 such that there would be no diaphragm material near weld seam 20 during a PWHT. In the embodiment shown in FIG. 3, diaphragm 30 would be collapsed toward central post 46 such that no diaphragm material would be in a radial position where it would be near weld seams 18 and 20 during a PWHT.

Figure 5:
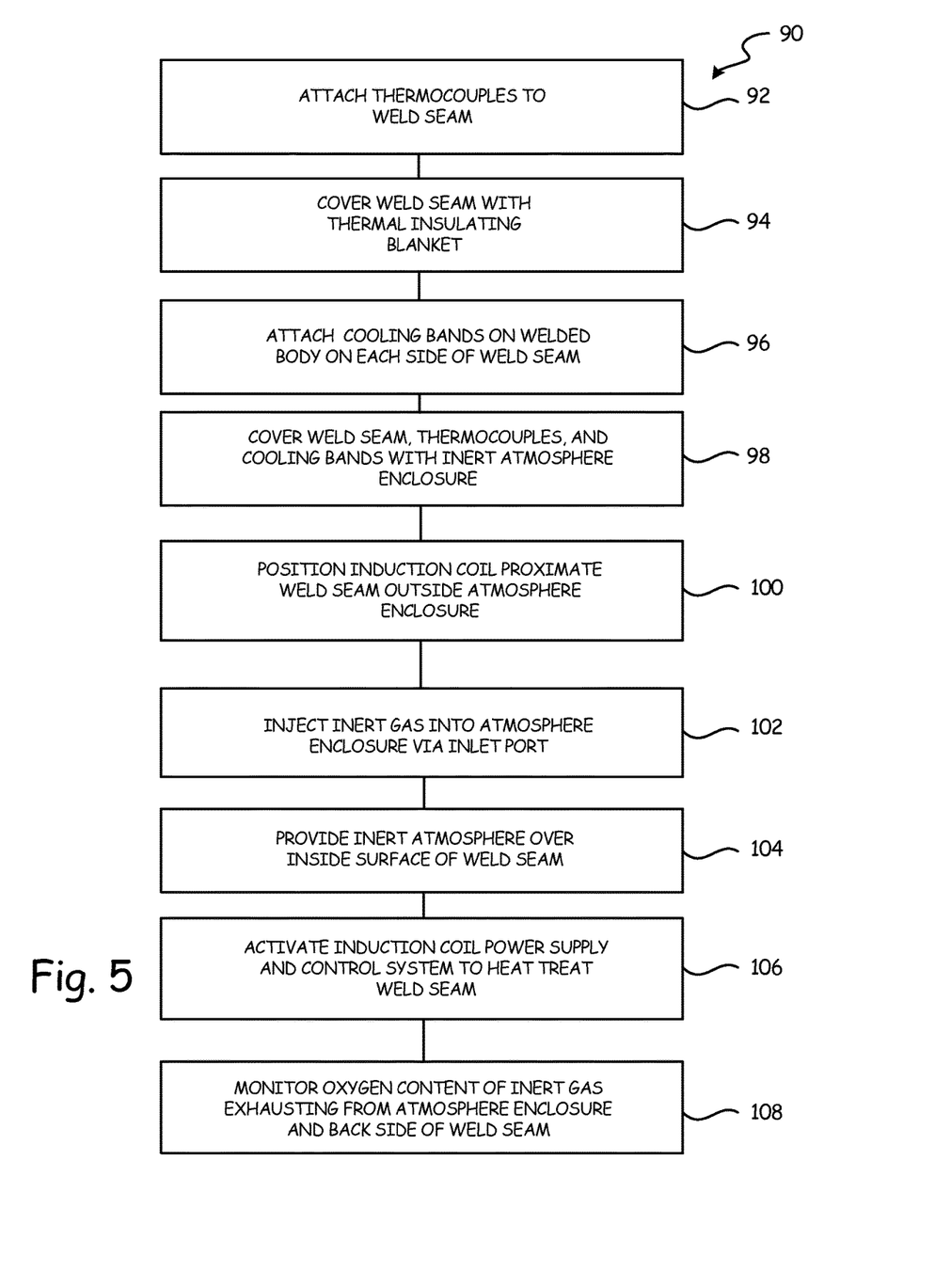
FIG. 5 is a diagram of a post-weld heat treatment process.

FIG. 5 is a flow diagram illustrating post-weld heat treatment method 90 according to an embodiment of the present invention. In the first step, thermocouple 68 may be attached to weld seams 18 and 20 to indicate temperature during the heat treatment (step 92). Weld seams 18 and 20 may then be covered with thermal insulating blanket 64 (step 94). Blanket 64 may be fabricated from any material with appropriate physical characteristics coupled with thermal and electrical insulating properties. Preferred insulating materials include woven fiberglass cloth or woven ceramic or refractory fiber cloth.

In the next step, cooling bands 62 may be attached to positive expulsion fuel tank 10 on each side of weld seams 18 and 20 (step 96). Cooling bands 62 may be shaped to closely follow the contour of the external surface of tank shell 12 and cylinder 16 and tank shell 14 and cylinder 16 of positive expulsion fuel tank 10. In an embodiment, interfaces between cooling bands 62 and positive expulsion fuel tank 10 may be filled with a thermally conducting adhesive 65 to ensure maximum thermal conductivity between cooling bands 62 and external surfaces of shell 12 and cylinder 16 and shell 14 and cylinder 16 of positive expulsion fuel tank 10 as shown in FIG. 4. Examples of thermally conducting adhesive material forms include tapes, greases, pastes, and sheets. Preferably cooling bands 62 may be placed at a distance of at least about 2 inches (5.08 cm) from the weld seams In the next step, weld seams 18 and 20, thermocouples 68, and cooling bands 62 may be covered with inert atmosphere enclosure 72 (step 98). Inert atmosphere enclosure 72 may contain inlet port 76 connected to an inert gas source as indicated by arrow 78 (FIG. 4). Inert atmosphere enclosure 62 may also include exhaust port 80 wherein the exhaust gases, indicated by arrow 82, may be analyzed by oxygen analyzer 83. As noted earlier, inert atmosphere enclosure 72 may be composed of an electrical non-conductor such that it is transparent to the induction field from induction coil 56.

Induction coil 56 (or multiple induction coils) may then be positioned proximate weld seams 18 and 20 outside inert atmosphere enclosure 72 (step 100). The induction system may include power supply and control system 58 connected to thermocouple 68 on weld seams 18 and 20 to provide a controllable time-temperature profile during the heat treatment. In some embodiments a larger enclosure may place the induction coil or coils within the inert atmosphere.

In the next step, inert gas may be inserted into inert atmosphere enclosure 72 at arrow 78 (step 102). At this point, the internal surface of positive expulsion fuel tank 10 may also be protected by filling interior 38 of positive expulsion fuel tank 10 with an inert atmosphere. A preferred oxygen level surrounding weld seams 18 and 20 is less than 50 ppm to prevent oxidation. Tank interior 38 may also be filled with flowing inert gas (step 104).

Power supply and control system 58 may then be activated to perform a post-weld heat treatment of weld seams 18 and 20 (step 106). During the post-weld heat treatment, the oxygen content of inert gas exiting inert atmosphere enclosure 72 at arrow 82 and the tank interior may be monitored by oxygen analyzer 83 to ensure the absence of oxidation during the heat treatment process (step 108).

A benefit of apparatus 50 is that weldments in thin wall metallic structures may be subjected to heat treatment profiles at temperatures exceeding 2000° F. (1098° C.) on site during which the heat affected zone is restricted to a minimum distance of at least about 2 inches (5.08 cm) from the weld seam. As a result, the microstructure and properties of material directly outside this distance from the weld seam are unaffected. In addition, the low thermal mass of the method allows rapid cool down following solution treatment, limiting unwanted precipitation and grain growth in the thin wall structure. Expensive and elaborate furnaces, retorts, and other equipment associated with heat treatment of complete structures are unnecessary.

In some embodiments, positive expulsion fuel tanks may be titanium or titanium alloys. Non-limiting examples may include CPTi, Ti-6Al-4V, and Ti-2.5V-4Al-1.5Fe (Ti38). Welds in these materials may be given a PWHT at about 1025° F. (552° C.) for about 3 hours.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A metallic positive expulsion fuel tank comprising:
    a first hemispherical shell having a circumferential edge;
    a pressurized propellant gas inlet attached to the first hemispherical shell;
    a metallic cylinder having a first circumferential edge and a second circumferential edge wherein the first circumferential edge is attached to the circumferential edge of the first hemispherical shell by a first weld seam;
    a second hemispherical shell having a circumferential edge;
    a fuel outlet fixture attached to the second hemispherical shell;
    a hemispherical elastomeric diaphragm attached to the fuel outlet fixture; and
    a second hemispherical shell attached to the second circumferential edge of the metallic cylinder by a second weld seam thereby forming two interior chambers separated by the elastomeric diaphragm;
    the first and second weld seams having localized post-weld heat-treated stress-relieved regions confined within a distance of 2 inches (5.08 cm) from the first weld seam and a distance of 2 inches (5.08 cm) from the second weld seam such that stresses in the first and second weld seams are relieved and the elastomeric diaphragm is unaffected by the heat treatment.

2. The metallic positive expulsion fuel tank of claim 1, wherein the first and second hemispherical shells and the metallic cylinder are constructed from a titanium alloy, an aluminum alloy, a corrosion resistant steel, or a nickel alloy.

3. The metallic positive expulsion fuel tank of claim 2, wherein the first and second hemispherical shells and the metallic cylinder are CPTi, Ti-6Al-4V, or Ti-2.5V-4Al-1.5Fe (Ti38).

4. The metallic positive expulsion fuel tank of claim 3, wherein the first and second hemispherical shells and the metallic cylinder are Ti-6Al-4V.

5. The metallic positive expulsion fuel tank of claim 1, wherein the elastomeric diaphragm is composed of silicone, ethylene propylene diene rubber, fluoroelastomers, or perfluoroelastomers.

6. The metallic positive expulsion fuel tank of claim 3, wherein the first and second weld seams are stress relieved by a localized post-weld heat treatment comprising about 1025° F. (552° C.) for about 3 hours.

7. The metallic positive expulsion fuel tank of claim 1, wherein the thickness of the first and second hemispherical shells and the metallic cylinder are from about 20 mils (508 microns) to about 125 mils (3175 microns).

8. The metallic positive expulsion fuel tank of claim 1, wherein the first and second weld seams comprise a gas tungsten arc weld, plasma arc weld, laser beam weld, or electron beam weld.

9. The metallic positive expulsion fuel tank of claim 1, wherein the positive expulsion fuel tank comprises a spacecraft engine fuel tank.

10. A method of forming a metallic positive expulsion fuel tank, the method comprising:
    forming a first hemispherical shell having a first edge;
    attaching a pressurized gas inlet fixture to the first hemispherical shell;
    forming a metallic cylinder having a first edge and a second edge;

welding the metallic cylinder to the first hemispherical shell along the first edge of the first hemispherical shell and the first edge of the metallic cylinder to form a first weld seam;

forming a second hemispherical shell having a first edge;

attaching a fuel outlet fixture to the second hemispherical shell;

forming an elastomeric diaphragm;

attaching the elastomeric diaphragm to the fuel outlet fixture;

welding the second hemispherical shell, elastomeric diaphragm and fuel outlet fixture to the metallic cylinder along the first edge of the second hemispherical shell and the second edge of the metallic cylinder to form a second weld seam and a container having two interior chambers separated by the elastomeric diaphragm; and performing a localized post-weld stress relief heat treatment on the first and second weld seams in which heating of the tank is confined to a distance of 2 inches (5.08 cm) from the first weld seam and a distance of 2 inches (5.08 cm) from the second weld seam such that stresses in the first and second weld seams are relieved and the elastomeric diaphragm is unaffected by the localized post-weld heat treatment.

11. The method of claim 10, wherein the first and second hemispherical shells and the metallic cylinder of the metallic positive expulsion fuel tank are constructed of a titanium alloy, an aluminum alloy, a corrosion resistant steel, or a nickel alloy.

12. The method of claim 10, wherein the first and second hemispherical shells and the metallic cylinder of the metallic positive expulsion fuel tank are constructed of CPTi, Ti-6Al-4V, or Ti-2.5V-4Al-1.5FE (Ti38).

13. The method of claim 10, wherein the elastomeric diaphragm is composed of silicone, ethylene propylene diene rubber, fluoroelastomers, or perfluoroelastomers.

14. The method of claim 10, wherein a thickness of the first and second hemispherical shells and the metallic cylinder is from about 20 mils (508 microns) to about 125 mils (3175 microns).

15. The method of claim 12, wherein the localized post-weld heat treatment comprises a temperature of about 1025° F. (552° C.) for about 3 hours.

16. The method of claim 10, wherein performing the localized post-weld heat treatment on the first and second weld seams comprises:

covering the external surface of the first weld seam with a first insulating blanket and the second weld seam with a second insulating blanket;

attaching at least four cooling bands to the external surface of the metallic positive expulsion fuel tank with at least one cooling band attached on each side of the first and second weld seams;

surrounding the first and second weld seams, the first and second insulating blankets, and the at least four cooling bands with an inert atmosphere enclosure;

providing an inert atmosphere within the inert atmosphere enclosure;

providing an inert atmosphere over the internal surface of the fuel tank;

positioning at least one induction coil proximate the first and second weld seams and external to the inert atmosphere enclosure;

activating the induction coil to subject the first and second weld seams to a localized post-weld heat treatment schedule while cooling regions external to the first and second weld seams with the at least four cooling bands;

sensing a temperature of the first and second weld seams with a temperature sensor; and controlling power supplied to the induction coil as a function of the sensed temperature.

17. The method of claim 16, wherein the induction coil is positioned inside the inert atmosphere enclosure.

18. The method of claim 10, wherein welding comprises gas tungsten arc, plasma arc, laser beam, or electron beam welding.

19. The method of claim 10, wherein the positive expulsion fuel tank comprises a spacecraft engine fuel tank.

20. A metallic positive expulsion fuel tank formed by the method of claim 10.

* * * * *